United States Patent
Sykes

[15] 3,667,591
[45] June 6, 1972

[54] NEWSPAPER BUNDLE FEEDING AND STORING SYSTEM

[72] Inventor: Thomas R. Sykes, Toronto, Ontario, Canada

[73] Assignee: Gerrard Company Ltd., Hamilton, Ontario, Canada

[22] Filed: Nov. 19, 1969

[21] Appl. No.: 878,063

[52] U.S. Cl. ............... 198/220 R, 198/220 BC, 198/220 DA
[51] Int. Cl. .......................................................... B65g 27/00
[58] Field of Search ............... 198/213, 214, 220 R, 220 BC, 198/220 CA, 220 BA, 220 DA; 221/156

[56] References Cited

UNITED STATES PATENTS

| | | | |
|---|---|---|---|
| 1,763,307 | 6/1930 | Hoffmann | 198/220 DA |
| 2,805,841 | 9/1957 | Kyle | 198/220 BC |
| 3,056,487 | 10/1962 | Kipper | 198/214 |
| 3,258,112 | 6/1966 | Allen | 198/220 BC |
| 3,381,804 | 5/1968 | Bjarko | 198/213 |

*Primary Examiner*—Richard E. Aegerter
*Attorney*—Douglas S. Johnson

[57] ABSTRACT

A feeding and storage system for handling bundled newspapers and the like is provided by a spiral chute mounted for oscillatory movement, the chute having a helical ramp encircling a central vertical column the ramp having a helix angle such that the bundle will be held by friction from moving down the ramp under gravitation with the chute stationary. Oscillatory movement in the requisite mode to move the bundle from the input end of the ramp to the output end is provided by a suitable drive and a control is provided adjacent each end of the ramp so that the ramp can be filled as a storage unit from the input end with the output end blocked and when the ramp is full or partially full and it is desired to draw off stored bundles, the chute can be controlled from the delivery end to effect bundle delivery.

3 Claims, 6 Drawing Figures

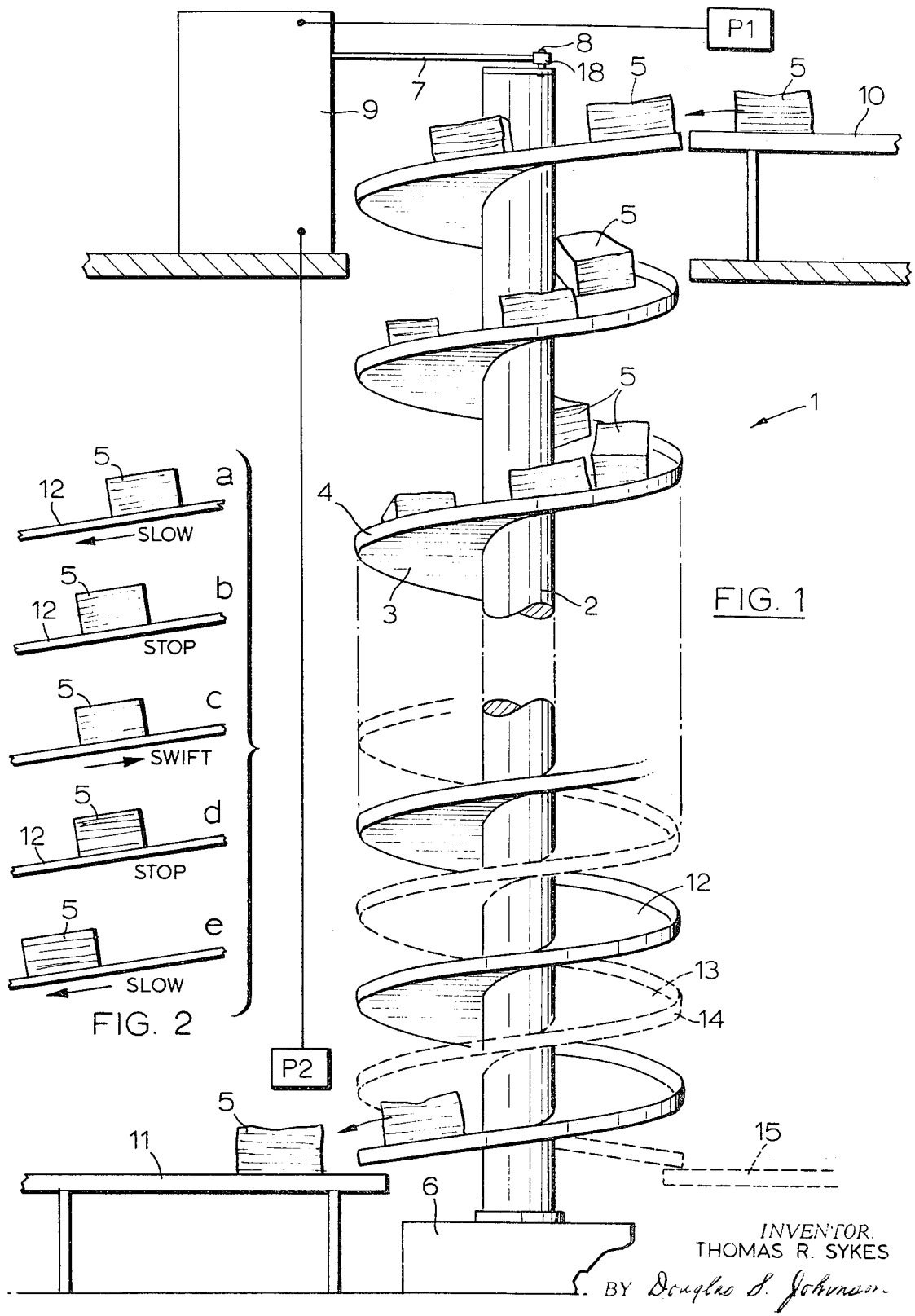

NEWSPAPER BUNDLE FEEDING AND STORING SYSTEM

FIELD OF INVENTION

This invention relates to a feeding and storing system for bundles of newspapers or the like, and more particularly to a feeding system which will deliver bundles of newspapers or the like from one elevation to another, will accomodate a stoppage in feed at the delivery end while continuing to accept and store bundles fed into the input end until the system is full, and will deliver the stored bundles on demand.

BACKGROUND OF INVENTION

Spiral chutes are commonly used to convey bundles of newspapers or magazines from an elevated mailing room or bindery to a truck loading dock at a lower elevation. Chutes of current design must be of a sufficiently low helix angle that when a bundle enters the chute it does not accelerate while travelling down the chute to a speed that would damage the bundle if it hit another bundle in the chute. At the same time the chute must be of a sufficient helix angle that if some part of the chute becomes full of bundles and they are brought to a stop because of a blockage at the delivery end, for example, these stationary bundles must overcome any static friction and resume their downward travel when the blocking bundles are removed.

This is, the slope of the chute must always be sufficient to overcome the static friction developed between a stationary bundle and the chute surface.

While it is known to utilize rotating and even sometimes vibrating spiral conveyors for feeding materials such as sand, grain, flour, cement and the like (usually delivered up the conveyor) such conveyors are simply delivery mechanisms and are not capable of handling either continuous or interrupted inputs and non synchronized intermittent deliveries as occurs in the newspaper industry where the bundles come off the tying or binding machines in either continuous or interrupted streams for delivery down the chutes to individual waiting trucks which back up to the loading dock, load their route and then move off allowing the next truck to back into loading position.

Moreover because the papers streaming off the presses must be conveyed away and tied immediately, they accumulate while awaiting the relatively slower intermittent process of truck pick up, and bundle storage awaiting pick up becomes an important problem both with respect to handling and with respect to space requirements.

SUMMARY OF THE INVENTION

According to the present invention the problems now involved in handling the bundled papers between the mailing room or bindery and the truck loading dock are resolved by the provision of a spiral chute which in addition to forming a feed system, also forms a large storage area between the mailing room and loading dock to accomodate the bundle accumulations resulting from the differences between input bundle feed and output bundle take-off.

More particularly according to the invention the spiral chute is formed with a very low helix angle to provide a large number of storage convolutions between the mailing room and the loading dock and to ensure that the bundles will not slide under gravity down the chute. That is the helix angle is such that the slope of the chute surface will at least be small enough that the gravitational force acting on a bundle resting on the chute surface will be insufficient to either overcome the static friction developed between the bundle and chute surface or to accelerate the bundle after movement is imparted thereto. The only minimum limitation on the helix angle of the chute is that the vertical separation of the successive chute convolutions must be such as to accomodate the height or size of the bundle therebetween so that the bundle can travel down the chute. To effect bundle travel according to the invention the chute is mounted for oscillitory or vibratory movement and means are provided to oscillate or vibrate the chute in a mode to effect travel of the bundle along the convolutions thereof in the appropriate direction until they reach a point of blockage. In this connection it will be understood that the chute can accomodate different rates of input and take off because the delivery end of the chute can in fact be blocked, that is output feed halted and the chute will continue to accept and feed to the point of the stopped bundles until the chute is full. To halt output feed means may be provided to block chute discharge or conveniently the chute may simply discharge the bundles into a position where they are or can be arrested in chute blocking position. In order to provide the requisite feeding and storage functions, separate control positions for effecting chute vibration or oscillation are placed in position for independent control by the operator in the mailing room in charge of chute input feed and bundle storage and by the truck driver or operator at the loading dock in charge of chute output delivery.

BRIEF DESCRIPTION OF DRAWINGS

FIG. 1 is a part diagrammatic, part elevational view illustrating a spiral chute feeding and storing system embodying the invention, the dotted outline of the second spiral illustrating the applicability of the invention to a single or double spiral.

FIGS. 2a to e are diagrammatic views illustrating the principle under which the bundles are moved during vibration or oscillation of the spiral chute.

DETAILED DESCRIPTION OF INVENTION

With reference to FIG. 1 the spiral chute generally designated at 1 and illustrated more or less diagrammatically, comprises a central vertical hollow column 2 which supports a spiralling ramp 3 the outer edge of which is provided with a curb 4 to maintain the bundles 5 to be fed on the ramp.

The chute comprised by the central vertical column 2 and the spiralling ramp 3 is pivot mounted on a suitable thrust bearing 6 so that the conveyor can be vibrated or oscillated in the requisite oscillatory mode to provide bundle feed along the convolutions thereof as hereinafter more fully described, utilizing the principles involved in vibratory material conveyors.

The vibration or oscillation of the spiral chute may be accomplished in any desired way. By way of illustration, the oscillating means is shown as a reciprocating rod 7 pivotally connected to the upper end of the column 2 by a pivotal connection 8 connecting the rod to crank arm 18 and driven by a suitable variable speed drive designated at 9 which imparts a reciprocating movement to the oscillating rod 7.

The means of imparting the oscillatory mode to the spiral chute is illustrated essentially diagrammatically since it is representative of many types of mechanisms which may be employed to produce oscillatory movement such as air vibrators, a motor mounted on an arm extending radially out from the axis of the chute and having on it an unbalanced rotating weight, or other vibratory devices as will be recognized by those skilled in the art. To provide flexibility for chute feed it is, of course, desirable that the motion creating mechanism such as the variable speed drive 9 provides for variation in the degree of angularly motion of the rod 7 and the frequency of oscillation.

The motion imparting means such as the variable speed drive 9 is arranged to be controlled from a first control position P1 located in the mailing room preferably in the vicinity of the end of the output conveyor or storage table 10 which receives the tied bundles of newspapers from a suitable tying machine not shown.

A second control position P2 is located at the loading dock adjacent to the take off conveyor or table 11 from which the truck drivers pick up the bundles allocated for their route.

The actual helix angle or angle of slope of the spiralling ramp 3 will, of course, vary in accordance with the size of bundles to be handled the material in which the bundles may be wrapped and the coefficient of friction of the actual ramp surface 12. In any event the helix angle must be sufficiently low as a maximum angle that a bundle of the kind to be fed placed on the ramp surface 12 will not move off under the force of gravity down the chute and preferably will not continue movement without deceleration after motion has been imparted thereto. The only criteria for the minimum helix angle is that there must be sufficient vertical clearance between the successive convolutions of the spiralling ramp to receive the largest bundle to be handled.

With reference to the diagrammatic illustrations of FIGS. 2a to e the desired mode of vibration or oscillation of the spiral chute 1 for bundle feed down the ramp is illustrated. The motion to the left illustrated in FIG. 2a, should be slow so that it will not overcome the static friction between the bundle 5 and the ramp surface 12. This movement will cause the bundle to move with the ramp as the ramp moves to the left and comes to the stop position shown in FIG. 2b. The return motion of the chute to the right should be rapid to overcome the static friction between the bundle and the chute surface so that the bundle remains stationary while the chute surface moves under the bundle and the chute returns to its initial position at the end of its cycle as shown in FIG. 2d.

FIG. 2e illustrates the commencement of the next successive cycle where the ramp moves slowly to the left carrying the bundle with it prior to being rapidly retracted to the right leaving the bundle at a point further down the chute.

To feed the bundles the spiral chute is oscillated and the bundles are delivered from the mailing room conveyor table 10 onto the upper end of the ramp 3. The bundles will travel down the ramp in the spaced relation in which they come off the table 10 under the action illustrated in FIG. 2 until they reach the take off conveyor or table 11. If the bundle arriving at the take off conveyor or table 11 is removed, feed will continue with the bundles maintaining their space relationship so long as the spiral ramp is oscillated in the requisite mode and the bundles are fed into the upper end of the chute. However, when for instance a truck has been loaded and the loading dock is unoccupied, the bundles discharging onto the table 11 will come to rest in a position blocking the discharge of subsequent bundles as illustrated in FIG. 1.

The importance of the large storage area provided by the low helix angle ramp then becomes apparent because feed of the bundles into the upper end of the chute from the mailing room conveyor or table 10 can be continued and they will feed down the chute under chute vibration until the chute is full. Thus instead of having to divert the output from the mailing room into a separate storage area, adequate storage space on the ramp can be provided to handle essentially all storage contingencies. In this connection, since the only limitation on the minimum angle of the helix is a clearance between successive convolutions, a large number of convolutions can be provided between the input and output sites and the diameter of the spiral chute can be increased as desired to provide additional spiral lines of feed and storage.

When the stream of bundles coming from the mailing room ceases, or if a particular spiral chute becomes full, the operator in the mailing room may stop the vibration of the chute from his control position P1 and the chute thus forms a spiral storage area. When under this condition a truck arrives for a load, the driver or operator removes the halted bundles on the take off table 11 and starts up the spiral chute vibration from his control position P2 to effect delivery of the stored bundles out of the chute.

For purposes of illustration, the spiralling ramp 3 has been shown as having substantial clearance between successive convolutions for the particular size of bundle illustrated. In this particular situation, the spiral chute can accomodate a second spiralling ramp 13 again having a curb 14 having its convolutions interposed between the convolutions of the spiral ramp 3. The second ramp 13 might for example be used to handle bundles having a relatively small number of papers say 10 or less coming from a different tying line whereas the ramp 3 might be reserved for bundles having a substantially larger number of papers. That is the convolutions of the ramp 14 may be vertically located between the convolutions of the ramp 3 so that the clearance between the upper surface of the ramp 13 and the under surface of ramp 3 will be different from the clearance between the lower surface of ramp 13 and the upper surface of ramp 3. Also the ramp 3 and 13 may be provided with different storage areas by making them of different diameters. As before the feed down ramp 13 will be achieved in the same way as described in relation to ramp 3 and bundles coming off ramp 13 will come to rest unless removed in chute blocking position on take off table or conveyor 15.

While the specific application of the invention for handling the bundles of newspapers between the elevated mailing room and the lower docking area requires a control of the bundle feed down a ramp, the principles involved could also be utilized to provide a feeding and storage system for bundles moving from a mailing room lower than the docking level, in which case the mode of vibration of the chute 1 would be reversed to effect movement of the bundles up the ramp 3. It will be understood that other various arrangements and modifications may be made by those skilled in the art without departing from the invention or scope of the appended claims.

I claim:

1. A feeding and storing system for handling bundled newspapers and like items having substantial mass and surface area, comprising:
   a spiral chute extending between vertically separated feed and delivery points, and having a helix angle such that a bundle to be fed will be held by frictional forces existing between the bundle and the surface of the chute from moving down the chute under gravitation with the chute stationary;
   means mounting said chute for oscillating movement;
   means imparting oscillatory movement having a non-uniform cycle to first move said chute sufficiently rapidly in one direction to overcome the static friction between said bundle and chute portion immediately beneath said bundle to displace said chute portion relative to said bundle in said direction, then to arrest said chute momentarily, and to move said chute sufficiently slowly in the reverse direction so that no relative movement of bundle and chute occurs, and finally to arrest said chute to complete said cycle, said direction of rapid movement being selected to move said chute portion relative to the bundle in a direction opposite to the desired direction of bundle feed along the chute;
   means at each of said feed and delivery points for starting and stopping oscillatory movement of said chute; horizontal platform means to arrest a bundle at the delivery point in chute locking position; wherein said spiral chute comprises a central vertical column, a first ramp spiralling around said column and a second ramp spiralling around said column with its convolutions interposed intermediate the convolution of said first ramp; each of said first and second spiral ramps having an in-put at said feed point and an output at said delivery point.

2. A system as claimed in claim 1 in which the convolutions of said second ramp are so disposed that the vertical clearance between the upper and lower surfaces thereof and the respective next adjacent lower and upper surfaces of the convolutions of the first ramp are different.

3. A feeding and storing system as claimed in claim 1 in which said rapid movement is in a direction to displace said chute portion relative to said bundle up the conveyor spiral to feed said bundle down said spiral chute.

* * * * *